(12) United States Patent
Lehmann et al.

(10) Patent No.: US 10,089,166 B2
(45) Date of Patent: Oct. 2, 2018

(54) CONFIGURING AND UTILIZING CALL-HOME SYSTEMS

(71) Applicant: International Business Machines Corporation, Armonk, NY (US)

(72) Inventors: Stefan Lehmann, Tucson, AZ (US); Erik Rueger, Ockenheim (DE); Christof Schmitt, Tucson, AZ (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 15/063,879

(22) Filed: Mar. 8, 2016

(65) Prior Publication Data

US 2017/0262329 A1    Sep. 14, 2017

(51) Int. Cl.
*G06F 11/07* (2006.01)

(52) U.S. Cl.
CPC ...... *G06F 11/0784* (2013.01); *G06F 11/0709* (2013.01); *G06F 11/0751* (2013.01); *G06F 11/0778* (2013.01)

(58) Field of Classification Search
CPC ............ G06F 11/0784; G06F 11/0709; G06F 11/0751; G06F 11/0778; G06F 11/3608; G06F 17/30309; G06F 17/30368; G06F 17/30371
See application file for complete search history.

(56) References Cited

U.S. PATENT DOCUMENTS

| | | | | |
|---|---|---|---|---|
| 7,827,148 B2 * | 11/2010 | Mori | ............... | G06F 19/3412 607/29 |
| 8,819,849 B2 * | 8/2014 | Birtwhistle | ........... | G06F 19/322 713/182 |
| 8,843,605 B2 * | 9/2014 | Seminaro | ................ | H04L 29/06 709/223 |
| 8,996,889 B2 * | 3/2015 | Consalus | .............. | G06F 21/602 713/193 |
| 9,071,631 B2 | 6/2015 | Dain et al. | | |
| 9,223,843 B1 * | 12/2015 | Madhavarapu | ... | G06F 17/30578 |
| 2006/0161593 A1 * | 7/2006 | Mori | ................... | G06F 19/3412 |
| 2007/0277061 A1 * | 11/2007 | Ashe | ................... | G06F 11/0748 714/57 |
| 2012/0117037 A1 * | 5/2012 | Suzuki | ............. | G06F 17/30368 707/692 |
| 2013/0137376 A1 | 5/2013 | Fitzgerald et al. | | |
| 2015/0195406 A1 | 7/2015 | Dwyer et al. | | |
| 2015/0227761 A1 | 8/2015 | Cohen | | |
| 2015/0269383 A1 | 9/2015 | Lang et al. | | |
| 2015/0295908 A1 | 10/2015 | Ohare et al. | | |

* cited by examiner

*Primary Examiner* — Nadeem Iqbal
(74) *Attorney, Agent, or Firm* — Bryan D. Wells

(57) ABSTRACT

Call-home systems are configured and utilized. A log file is presented on a user interface of a computing device. One or more interactions that are associated with one or more instructions to modify the log file are detected on the user interface. One or more modifications to the log file are applied to the log file based on the one or more interactions. The one or more modifications include at least one of a modification that omits information from the log file, a modification that redacts information in the log file, and a modification that obfuscates information in the log file. The modified version of the log file is transferred to a call-home server based on one or more data transfer options.

20 Claims, 5 Drawing Sheets

CONFIGURING AND UTILIZING CALL-HOME SYSTEMS

TECHNICAL FIELD

The present invention relates generally to the field of computer system administration and, more particularly, to configuring and utilizing call-home systems.

BACKGROUND

After a customer receives a product, a vendor of the product may continue to provide support services to the customer. Call-home systems are one way in which vendors can provide support services. A call-home system is a system that communicatively connects a support service infrastructure to supported product(s) that are deployed on a customer's premises. In general, a call-home system automatically notifies a vendor or another support-service provider when an issue is detected with a supported product. In addition to merely alerting a vendor of an issue with a supported product, call-home systems can also provide the vendor with various kinds of information so that the vendor can determine how best to address the issue that the customer is experiencing (e.g., the identity of the effected hardware and/or software, the type of issue, and various performance metrics).

SUMMARY

According to one embodiment of the present invention, a first method is provided. The first method includes: presenting, by one or more computer processors, a log file on a user interface of a first computing device; detecting, by one or more computer processors, one or more interactions with the user interface that are associated with one or more instructions to modify the log file; applying, by one or more computer processors, one or more modifications to the log file, based on the one or more interactions, to create a modified version of the log file, wherein the one or more modifications include at least one of (i) a modification that omits information from the log file, (ii) a modification that redacts information in the log file, and (iii) a modification that obfuscates information in the log file; and transferring, by one or more computer processors, the modified version of the log file to a call-home server based on one or more data transfer options.

According to one embodiment of the present invention, a second method is provided. The second method includes: presenting on a user interface of a first computing device, by one or more computer processors, one or more configuration options, wherein the one or more configuration options include at least one of (i) an option to omit information from a log file, (ii) an option to redact information in the log file, and (iii) an option to obfuscate information in the log file; sending to a second computing device, by one or more computer processors, (i) one or more instructions to generate the log file based on one or more selected configuration options and (ii) one or more instructions to send the log file to the first computing device; presenting, by one or more computer processors, the log file on the user interface of the first computing device; and transferring, by one or more computer processors, the log file to a call-home server based on one or more data transfer options.

According to another embodiment of the present invention, a computer system is provided. The computer system includes one or more computer processors, one or more computer readable storage media, and program instructions stored on the computer readable storage media for execution by at least one of the one or more processors. The program instructions include: program instructions to present a log file on a user interface of a first computing device; program instructions to detect one or more interactions with the user interface that are associated with one or more instructions to modify the log file; program instructions to apply one or more modifications to the log file, based on the one or more interactions, to create a modified version of the log file, wherein the one or more modifications include at least one of (i) a modification that omits information from the log file, (ii) a modification that redacts information in the log file, and (iii) a modification that obfuscates information in the log file; and program instructions to transfer the modified version of the log file to a call-home server based on one or more data transfer options.

DETAILED DESCRIPTION

Embodiments of the present invention recognize that it is often difficult to convince customers to implement call-home system features due to various security and privacy concerns associated with confidential information. For example, customers may not wish to provide support-service providers with customer network information or other information related to hardware or hosted software. In particular, customers are often reluctant to enable automatic transmission of log files (e.g., system logs, event logs, message logs, and transaction logs) via call-home systems. In order to protect confidential information, some customers choose to have system administrators (i) manually edit log files to protect confidential information, (ii) obtain approval to forward the edited log files to vendors, (iii) print the approved log files, and (iv) provide vendors with scanned images of the printed log files. This process can be time consuming and can introduce errors into log files. Additionally, customer reluctance to utilize call-home systems increases the difficulty of obtaining health, performance, and usage information concerning products in the field. Collecting such information is advantageous in order to enable vendors to proactively address issues with their products and make other improvements to their products.

Embodiments of the present invention provide a call-home system that alerts system administrator(s) to issues with supported product(s) and enables the system administrator(s) to determine whether or not to forward to a support-service provider a log file that is generated in accordance with an information security policy.

Figure 1:
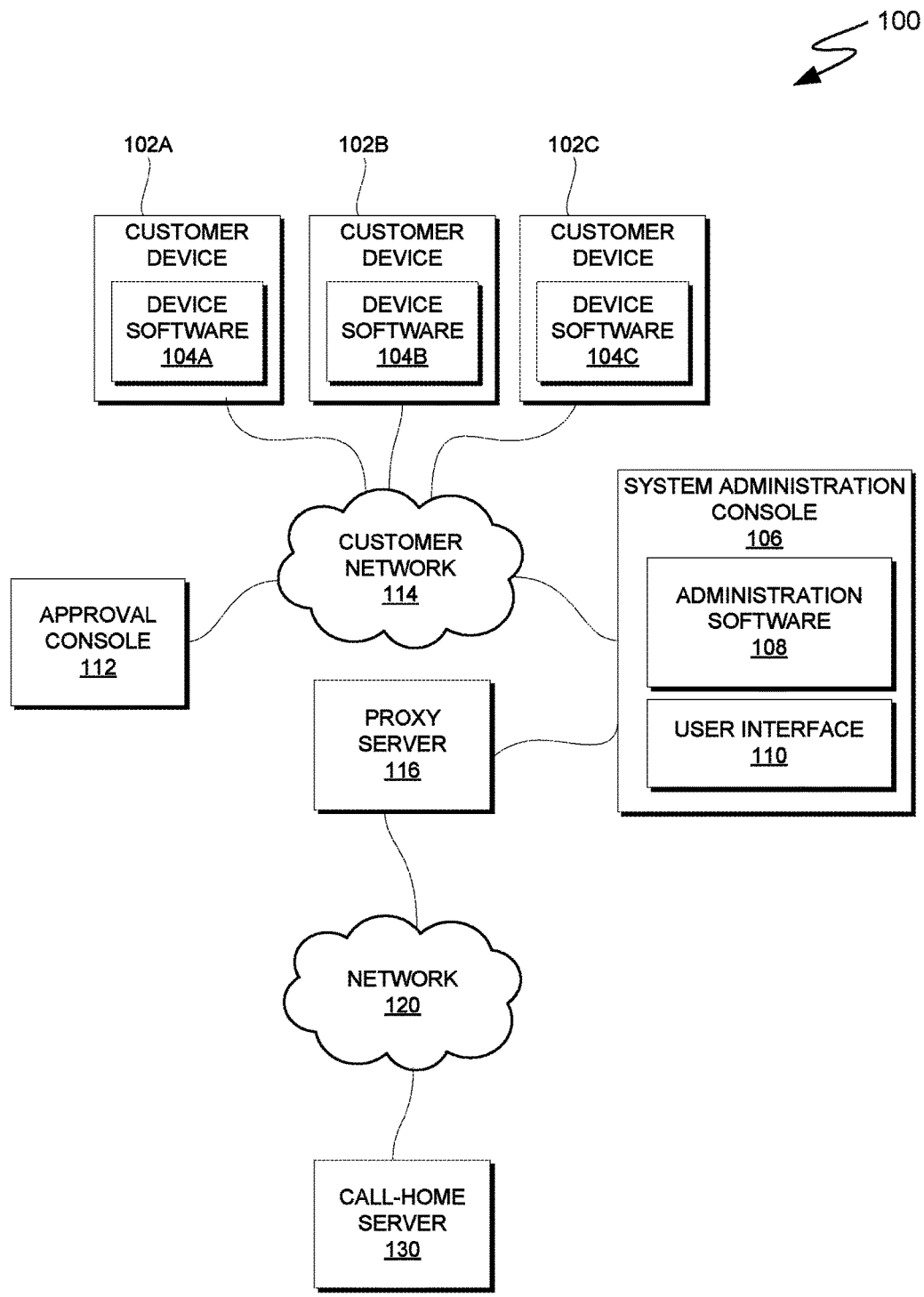
FIG. 1 is a functional block diagram illustrating a computing environment that depicts a call-home system, in accordance with an embodiment of the present invention.

Embodiments of the present invention will now be described in detail with reference to the Figures. FIG. 1 is a functional block diagram illustrating a computing environment that depicts a call-home system, in accordance with an embodiment of the present invention. For example, FIG. 1 is a functional block diagram illustrating call-home system 100. Call-home system 100 includes customer network 114, which communicatively connects customer device 102A, customer device 102B, and customer device 102C to system administration console 106. In the embodiment depicted in FIG. 1, customer network 114 also communicatively connects system administration console 106 to approval console 112, and proxy server 116 communicatively connects system administration console 106 to call-home server 130 via network 120.

Customer device 102A, customer device 102B, and customer device 102C are collectively referred to as customer devices 102 hereafter. In various embodiments, each of customer device 102A, customer device 102B, and customer device 102C is a computing device that can be a standalone device, a server, a laptop computer, a tablet computer, a netbook computer, a personal computer (PC), or a desktop computer. In another embodiment, one or more of customer devices 102 represents a computing system utilizing clustered computers and components to act as a single pool of seamless resources. In general, each of customer devices 102 can be any computing device or a combination of devices with access to system administration console 106 and with access to and/or capable of executing respective instances of device software 104 (i.e., device software 104A, device software 104B, or device software 104C). Additionally, customer devices 102 can be a combination of different types of computing devices for which a vendor or another entity (e.g., a support-service provider that manages call-home server 130) provides support services or that execute software for which support services are provided (e.g., the vendor can provide one or both of computing hardware and software to the customer). Call-home system 100 can also include a different count of customer devices 102 without departing from the scope of the present invention. Each of customer devices 102 can include internal and external hardware components, as depicted and described in further detail with respect to FIG. 4.

In the embodiment depicted in FIG. 1, device software 104A, device software 104B, and device software 104C are respectively stored and executed on customer device 102A, customer device 102B, and customer device 102C. Device software 104A, device software 104B, and device software 104C are collectively referred to as instances of device software 104. In other embodiments, one or more instances of device software 104 can reside on other computing device(s), provided that each such instance can access and is accessible by a respective customer device of customer devices 102, and provided that each such instance can access and is accessible by administration software 108 executing on system administration console 106. In yet other embodiments, one or more instances of device software 104 can be stored externally and accessed through a communication network, such as customer network 114.

In general, instances of device software 104 operate to notify system administration console 106 of an issue or event that is associated with a supported product (e.g., an issue with a respective customer device of customer devices 102 or software executing thereon) so that a customer can decide whether or not to forward information (e.g., log files) to call-home server 130 or otherwise transfer the information to a support-service provider, as described herein. In some embodiments, instances of device software 104 provide log files to system administration console 106, as discussed in great detail with respect to FIG. 2. In other embodiments, instances of device software 104 provide data to system administration console 106 to enable system administration console 106 to similarly generate log files. While each instance of device software 104 provides at least some of the aforementioned features and the features described with respect to FIG. 2, persons of ordinary skill in the art will understand that the logic of various instances of device software 104 can differ based on the computing devices on which they execute (e.g., based on whether an instance of device software 104 executes on customer device 102A, 102B, or 102C) or based on the respective products for which support services are provided. Additionally, persons of ordinary skill in the art will understand that one or more instances of device software 104 can describe a feature (i.e., a portion of code) of supported software that is executing on one or more of customer devices 102.

Customer network 114 can be a local area network (LAN), a wide area network (WAN) such as the Internet, or a combination of the two, and can include wired, wireless, fiber optic or any other connection known in the art. In general, customer network 114 can be any combination of connections and protocols that will support communications between customer devices 102 and system administration console 106. In the embodiment depicted in FIG. 1, customer network 114 also supports communication between system administration console 106 and approval console 112.

In various embodiments, system administration console 106 includes a display and one or more user input devices, such as a mouse and keyboard. In general, system administration console 106 enables a user (e.g., a system administrator) to selectively transfer, to a support-service provider (e.g., via call-home server 130), information that instances of device software 104 send to system administration console 106, as described in greater detail with respect to FIGS. 3A and 3B. In some embodiments, system administration console 106 is physically integrated with a computing device that can be a standalone device, a server, a laptop computer, a tablet computer, a netbook computer, a personal computer (PC), a desktop computer, a personal digital assistant (PDA), a smart phone, or any programmable electronic device capable of communicating with customer devices 102 via customer network 114 and call-home server 130 via network 120. In the embodiment depicted in FIG. 1, system administration console 106 is integrated with a computing device that executes administration software 108 and provides user interface 110. In other embodiments, system administration console 106 is a computing system utilizing clustered computers and components to act as a single pool of seamless resources. In general, system administration console 106 can be any computing device or a combination of devices with access to customer devices 102 and with access to and/or capable of executing administration software 108 and providing user interface 110. System administration console 106 can include internal and external hardware components, as depicted and described in further detail with respect to FIG. 4.

Figure 3A:
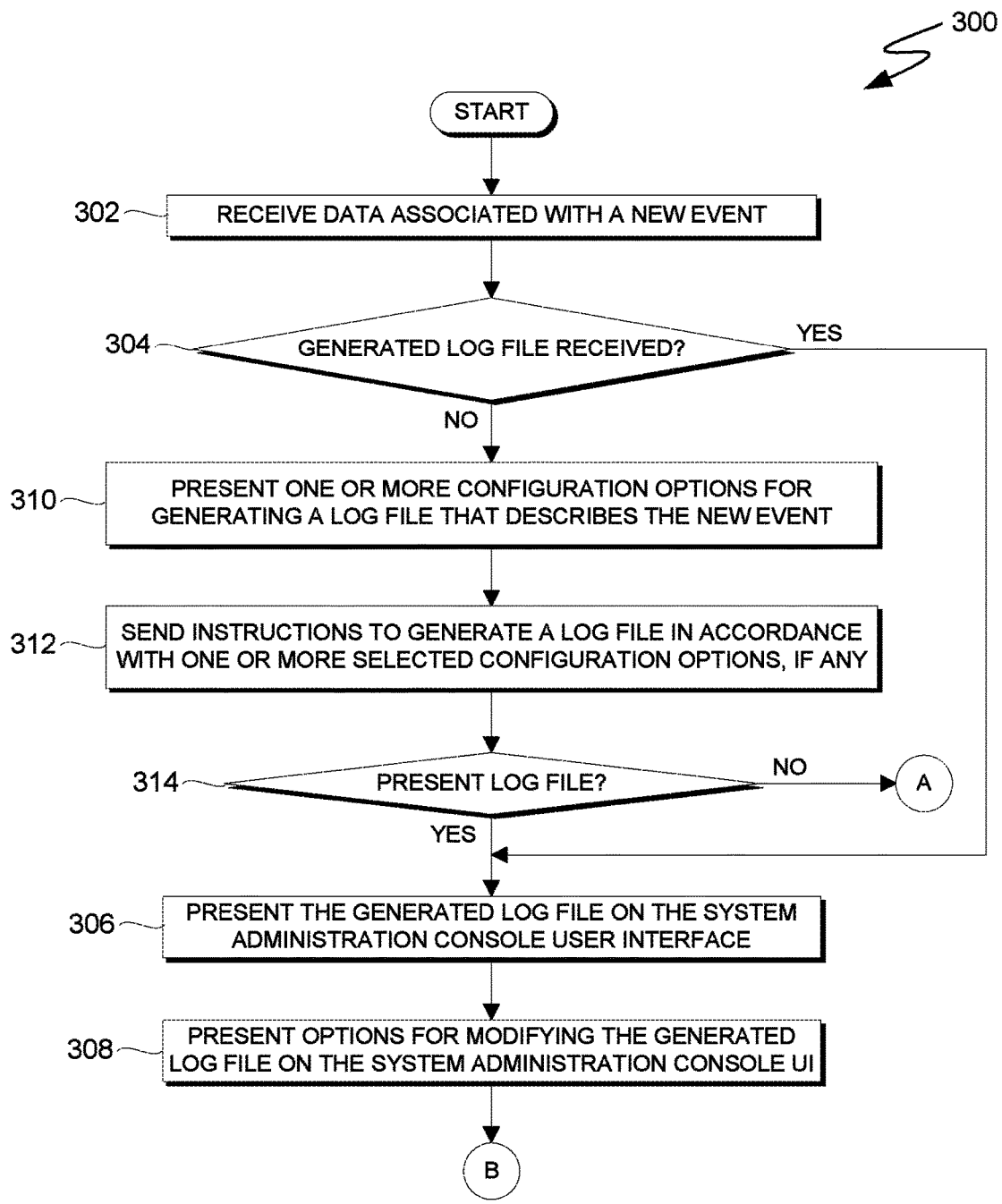
FIGS. 3A and 3B are flowcharts depicting operations for transferring log files to a support-service provider, on a computing device within the computing environment of FIG. 1, in accordance with an embodiment of the present invention.
Figure 3B:
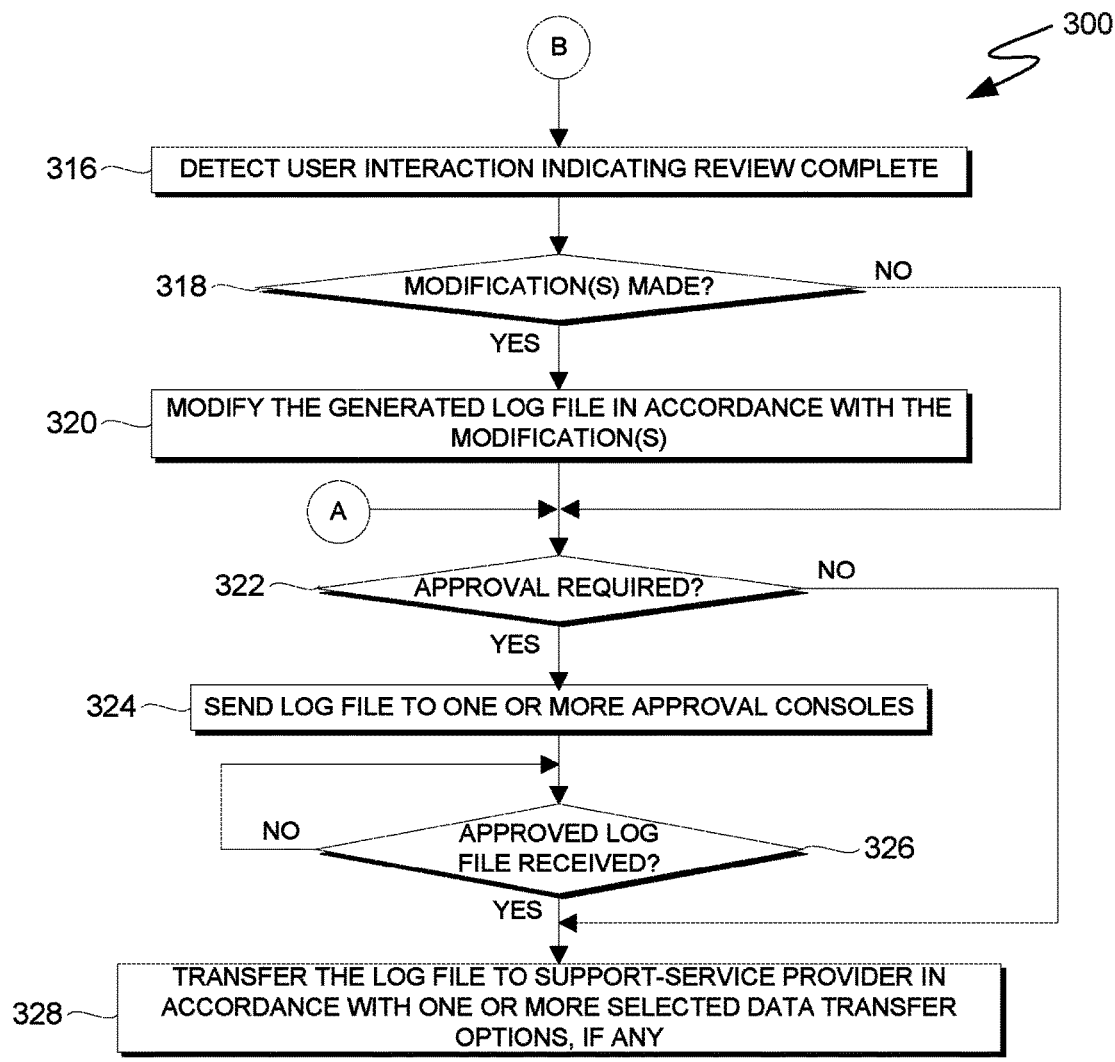

In general, administration software 108 operates to (i) notify a user of system administration console 106 of issue(s) that one or more of customer devices 102 are experiencing and (ii) present various options for generating log files in accordance with an information security policy, as described in greater detail with respect to FIGS. 3A and 3B. In the embodiment depicted in FIG. 1, a user of system administration console 106 can interact with administration software 108 via user interface 110. In the depicted embodiment, user interface 110 executes locally on system administration console 106 and operates to provide a user interface (UI) to a user of system administration console 106. User interface 110 operates to receive user input from the user via the provided user interface, thereby enabling the user to interact with system administration console 106 and administration software 108. In some embodiments, one or both of administration software 108 and user interface 110 are stored on system administration console 106. In other embodiments, one or both of administration software 108 and user interface 110 are stored on another computing device provided that system administration console 106 can access and is accessible by at least user interface 110 and administration software 108.

In some embodiments, such as the embodiment depicted in FIG. 1, system administrators do not have authority to transfer log files to support-service providers (e.g., by sending log files to call-home server 130) without first having the log files approved. In such embodiments, system administration console 106 is communicatively connected to one or more instances of approval console 112 (e.g., via customer network 114). Approval console 112 includes a display and one or more user input devices such as a mouse and keyboard. In general, approval console 112 enables a user (i.e., an "approver") to review log files in order to ensure that the log files comply with an information security policy of the customer. In some embodiments, however, approval console 112 executes software that compares received data with one or more provisions of an information security policy and, based on the comparison, approves or disapproves the data, at least in part, for transmission to the support-service provider. A single approval console 112 is depicted in FIG. 1. Other embodiments can include a plurality of approval consoles so that a generated log file can be sent to one or more of the approval consoles for review. In some embodiments, approval console 112 is physically integrated with a computing device that can be a standalone device, a server, a laptop computer, a tablet computer, a netbook computer, a personal computer (PC), a desktop computer, a personal digital assistant (PDA), a smart phone, or any programmable electronic device capable of communicating with system administration console 106. In other embodiments, approval console 112 is a computing system utilizing clustered computers and components to act as a single pool of seamless resources. In general, approval console 112 can be any computing device or a combination of devices that are communicatively connected to system administration console 106 and capable of presenting log files to a user of approval console 112. In embodiments like the embodiment depicted in FIG. 1, approval console 112 communicates with system administration console 106 via customer network 114. In other embodiments, approval console 112 communicates with system administration console 106 via an analogous but separate network or network 120. Additionally, approval console 112 can include internal and external hardware components, as depicted and described in further detail with respect to FIG. 4.

Network 120 can be a local area network (LAN), a wide area network (WAN) such as the Internet, or a combination of the two, and may include wired, wireless, fiber optic or any other connection known in the art. In general, network 120 can be any combination of connections and protocols that will support communications between system administration console 106 and call-home server 130. In some embodiments, system administration console 106 is indirectly connected to network 120. In the embodiment depicted in FIG. 1, for example, proxy server 116 communicatively connects system administration console 106 to network 120. In one example of such an embodiment, proxy server 116 is a simple mail transfer protocol (SMTP) server that utilizes electronic messages (i.e., emails) to forward log files to call-home server 130. Persons of ordinary skill in the art will understand that using an indirect connection between computing devices that are connected to both customer network 114 and network 120 can advantageously provide increased security with respect to customer devices 102 and other computing devices that are connected customer network 114. In other embodiments, system administration console 106 connects to network 120 directly.

In some embodiments, call-home server 130 is a computing device that is managed by the vendor of one or both of hardware and software for which support services are provided (e.g., products for which the instances of device software 104 can generate log files). In other embodiments, call-home server 130 is a computing device that managed by an entity, other than the vendor, that provides support services for such hardware and/or software. Call-home server 130 can be a standalone device, a server, a laptop computer, a tablet computer, a netbook computer, a personal computer (PC), or a desktop computer. In another embodiment, call-home server 130 represents a computing system utilizing clustered computers and components to act as a single pool of seamless resources. In general, call-home server 130 can be any computing device or a combination of devices that is capable of receiving and storing information (e.g., log files) received from system administration console 106. In various embodiments, call-home server is a SMTP server that receives log files via electronic messages (i.e., emails). To store received log files or other forms of information, call-home server 130 can include one or more data repositories (not depicted) that can store received log files and other information such that the entity providing support services (i.e., the support-service provider) can access the stored log files.

Figure 2:
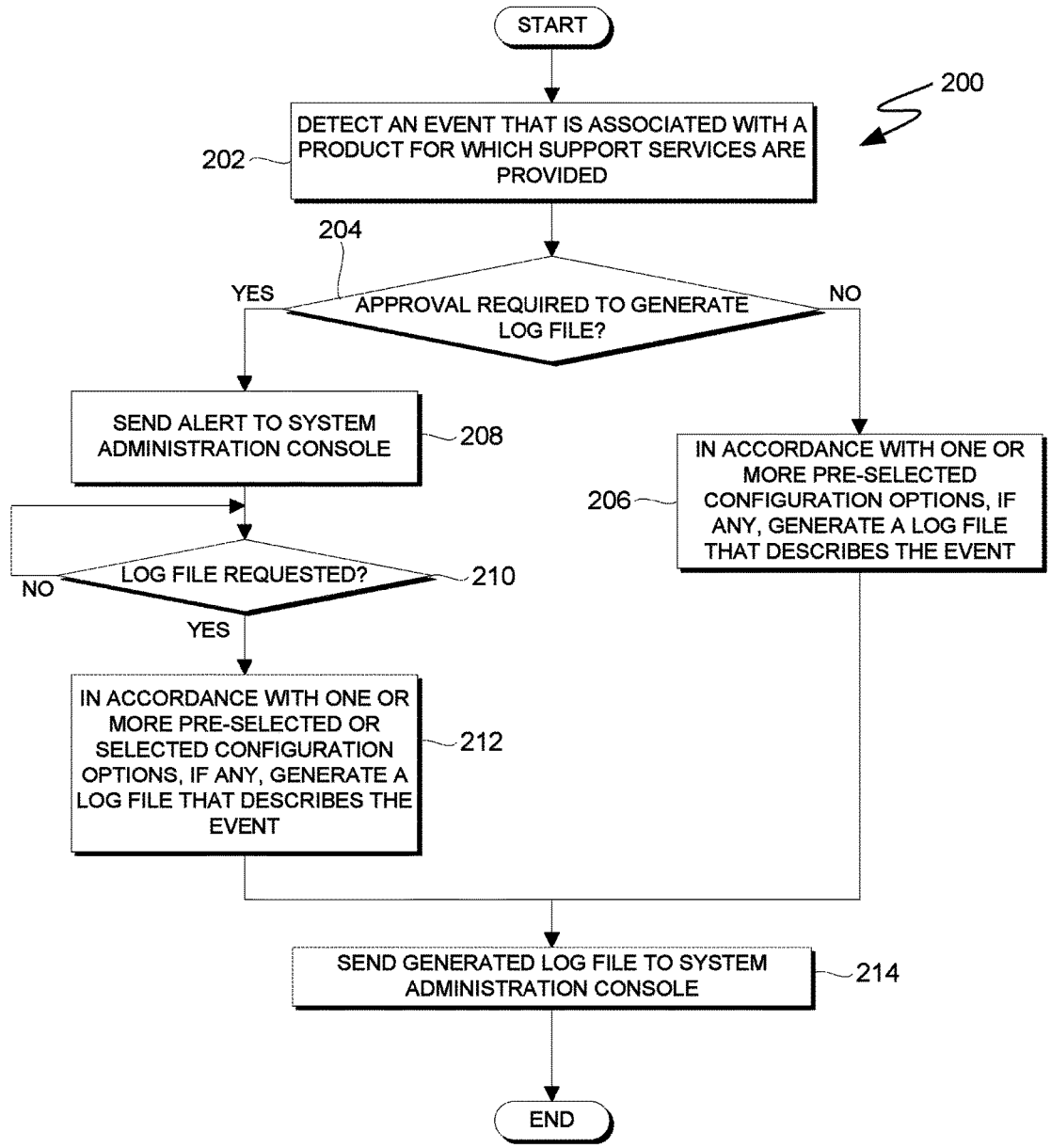
FIG. 2 is a flowchart depicting operations, on a computing device within the computing environment of FIG. 1, for providing a log file to a system administration console, in accordance with an embodiment of the present invention.

FIG. 2 is a flowchart depicting operations, on a computing device within the computing environment of FIG. 1, for providing a log file to a system administration console, in accordance with an embodiment of the present invention. For example, FIG. 2 is a flowchart depicting operations 200 of an instance of device software 104 within call-home system 100. Persons of ordinary skill in the art will understand that "the instance of device software 104," as used with respect to FIGS. 2, 3A, and 3B, can refer to one of device software 104A, 104B, and 104C. Additionally, persons of ordinary skill in the art will understand that the logic of operations 200 can differ between instances of device software 104 based on (i) respective configurations of such instances of device software 104 or (ii) the hardware or software for which such instances of device software 104 can generate log files.

In the embodiment depicted in FIG. 2, the instance of device software 104 determines whether or not approval (e.g., a system administrator's approval) is required to generate a log file that describes an event that is associated with a product for which support services are provided (204) in response to detecting the event (202). Accordingly, some embodiments of device software 104 include logic for monitoring the hardware or software for which support service are provided. Other embodiments of the instance of device software 104 determine whether or not approval is required to generate a log file (204) in response to receiving a notification that such an event has occurred. In various embodiments of device software 104, the event can be one or more performance metrics crossing respective thresholds, a hardware failure, a software failure, another event that may cause a customer to utilize the provided support services, or any combination of the aforementioned events.

If the instance of device software 104 determines that approval is not required to generate a log file that describes the event (204, NO branch), the instance of device software 104, automatically generates a log file in accordance with one or more pre-selected configuration options, if any (206). Embodiments of the present invention provide various configuration options that a customer can select (e.g., via user interface 110 of system administration console 106) to configure the instance of device software 104. In some embodiments, permitting the instance of device software 104 to automatically generate a log file in response to detecting the event is one of the selectable configuration options. Other configuration options can be selected such that generated log files comply, at least in part, with an information security policy. For example, a customer's security policy may prohibit sharing network configuration information, personal information, name information (e.g., names associated with customer devices 102), or various other types of confidential information that may raise security or privacy concerns if distributed to a support-service provider.

Instances of device software 104 can be configured such that the instances of device software 104 automatically omit, redact, or obfuscate (e.g., by replacing confidential information with placeholder values) such information in log files. For example, the instance of device software 104 can replace a logical unit number (LUN) name with an associated LUN identification number or replace a name of a host computing device with an identification number of the host computing device based on the selected configuration options. In some embodiments, a customer can configure the instance of device software 104 by selecting from the configuration options (e.g., via user interface 110 of system administration console 106) one or more predefined types of confidential information to omit, redact, or obfuscate in generated log files. In addition to, or in place of, selecting one or more types of predefined confidential information from the configuration options, the configuration options can include an option to configure the instance of device software 104 by creating or modifying search strings that identify specific terms and/or specific values to omit, redact, or obfuscate in the generated log files. In various embodiments, the customer can configure the instance of device software 104 to execute operations for one of omitting, redacting, or obfuscating information with respect to each selected configuration option (e.g., for each type of predefined confidential information, each specific term, or each specific value). If a customer does not configure the instance of device software 104 to automatically omit, redact, or obfuscate any information in the generated log file, the log file is generated "as is" and may contain confidential information. In some embodiments, generating log files "as is" is one configuration option. The instance of device software 104 sends the generated log file to system administration console 106 (214).

If the instance of device software 104 determines that approval is required to generate a log file (204, YES branch), the instance of device software 104 sends an alert to system administration console 106 (208). In some embodiments, requiring that the instance of device software 104 receive approval to generate log files is a configuration option. If a log file that describes the event is requested (210, YES branch), the instance of device software 104 generates a log file in accordance with one or more pre-selected configuration options, if any, as previously described. In some embodiments, user interface 110 presents the alert such that a user of system administration console 106 (e.g., a system administrator) can review any pre-selected configuration options and can select additional configuration options prior to requesting that the instance of device software 104 generate a log file. In addition to generating a log file in accordance with any pre-selected configuration options, the instance of device software 104 generates the log file in accordance with one or more configuration options, as described herein, that the user of system administration console 106 selected upon reviewing the alert, if any, (212) and sends the generated log file to system administration console 106 (214). Until the user of system administration console 106 instructs the instance of device software 104 to generate a log file, the instance of device software 104 remains idle with respect to the detected event until a user of system administration console 106 requests a log file that describes the event or the instance of device software 104 is terminated (210, NO branch). If, however, additional events are detected (202), the instance of device software 104 can execute operations 200 with respect to the additional events while remaining idle with respect to one or more other events.

In some embodiments, various instances of device software 104 do not determine whether or not approval is required to generate a log file (i.e., 204 is omitted) and such instances of device software 104 either automatically generate log files in response to detecting the event or require approval to generate log files depending upon the logic of the respective instances of device software 104. In other embodiments of the present invention, one or more instances of device software 104 can send data that describes detected events to system administration console 106. In such embodiments, administration software 108 includes logic to generate log files from the data, as described with respect to instances of device software 104 (i.e., a user of system administration console 106 can generate log files in accordance with selected configuration option(s) via administration software 108).

FIGS. 3A and 3B are flowcharts depicting operations for transferring log files to a support-service provider, on a computing device within the computing environment of FIG. 1, in accordance with an embodiment of the present invention. For example, FIG. 3 is a flowchart depicting operations 300 of administration software 108 on system administration console 106 in call-home system 100.

In response to receiving data that is associated with a new event from an instance of device software 104 (302), administration software 108 determines whether or not the received data is a generated log file or an alert (304). In general, the data will be a generated log file or an alert depending on the configuration of the instance of device software 104 (i.e., depending on how the instance of device software 104 executed operations 200). As used with respect to FIGS. 3A and 3B, a "new event" is an event for which system administration console 106 has not yet received an alert or a log file from the instance of device software 104. In some embodiments, for example, (i) each event is associated with an event identifier (e.g., an event identification number) and (ii) each alert and each generated log file references the event identifier in data or metadata. Upon receiving a generated log file, administration software 108 can determine whether or not system administration console 106 has received an alert that is associated with the same event identifier as the generated log file in order to execute operations 300 as described herein.

If administration software 108 determines that the received data is a generated log file that describes a new event (304, YES branch), administration software 108 presents the generated log file on user interface 110 such that a user of system administration console 106 can review the generated log file (306). In some embodiments, administration software 108 also presents one or more options and/or tools for modifying the generated log file (308) to, for example, omit, redact, or obfuscate additional information (e.g., information not already omitted, redacted, or obfuscated by the instance of device software 104 in accordance with any pre-selected configuration options). The options for modifying the generated log file can include options for manually deleting various portions of the generated log file; options for searching for specific terms or values within the generated log file; and options for omitting, redacting, or obfuscating predefined types of information as described with respect to the configuration options in FIG. 2.

If administration software 108 determines that the received data is not a generated log file that describes the new event (e.g., administration software 108 determines that the received data is an alert; 304, NO branch), administration software 108 presents, on user interface 110, one or more configuration options for generating a log file that describes the new event, as discussed with respect to FIG. 2 (e.g., if the received data is data sent as an alert to system administration console 106 (208); 310). Administration software 108 sends instructions to generate a log file describing the new event, in accordance with any selected configuration options, to the instance of device software 104 (312). In some embodiments, administration software 108 sends the instructions in response to detecting a specific user interaction(s) with user interface 110 (e.g., a user of system administration console 106 clicking on a "generate log file" button of user interface 110; a different type of click, hover, or keystroke on user interface 110; or another type of interaction with user interface 110).

As described herein, embodiments of the present invention permit a user of approval console 112 to review a generated log file for compliance with an information security policy prior to approving the log file for transfer to a support-service provider (e.g., by presenting the generated log file on user interface 110 (306)). In some embodiments, administration software 108 presents, on user interface 110, an option for a user of system administration console 106 to review the requested log file prior to approval console 112 receiving the generated log (or prior to transferring the generated log file to the support-service provider). For example, presenting one or more configuration options (310) can include presenting a configuration option that, if selected, instructs administration software 108 to present the generated log file, or a prompt to present the generated log file, on user interface 110 (306) prior to sending the generated log file to approval console 112 (324) and/or prior to transferring the generated log file to the support-service provider (e.g., prior to sending the generated log file to call-home server 130; 328). In other embodiments, the generated log file is automatically sent to system administration console 106 and administration software 108 automatically presents the generated log file, or a prompt to present the generated log file, on user interface 110 (306). In yet other embodiments, the generated log file is automatically sent to approval console 112 (324), if applicable, or automatically transferred to the support-service provider (328). And in some embodiments, administration software 108 requires that a user of system administration console 106 select, prior to sending instructions to generate the log file to the instance of device software 104, one of a plurality of options that include an option to send the generated log file to system administration console 106 (214) and an option to send the generated log file to approval console 112, if applicable, or transfer the log file to the support-service provider (i.e., administration software 108 has no default behavior with respect to these options).

If administration software 108 determines that administration software 108 is to present the generated log file, or a prompt to present the generated log file, on user interface 110 (314, YES branch), administration software 108 receives the generated log file and presents the generated log file (or a prompt to present the generated log file) on user interface 110 (306). In various embodiments, administration software 108 also presents one or more options for modifying the generated log file on user interface 110 (308), as described herein. As previously discussed, the generated log file can include data or metadata that enables administration software 108 to differentiate the requested log file from log file(s) describing other events. If administration software 108 determines that administration software 108 is not to present the generated log file on user interface 110 (314, NO branch), administration software 108 sends the generated log file to approval console 112 (324) or transfers the generated log file to the support-service provider (328), as described herein.

In the embodiment depicted in FIG. 3B, administration software 108 determines whether or not a user of system administration console 106 made any modifications to the generated log file (318) in response to detecting an interaction with user interface 110 that indicates that a review of the generated log file is complete (e.g., detecting a click on a "review complete" button of user interface 110; 316). If administration software 108 determines that the user made one or more modifications to the generated log files (318, YES branch), administration software 108 modifies the generated log file in accordance with one or more detected user interactions (e.g., click(s), keystroke(s), or any other input(s) detected on user interface 110 that are associated with instructions to modify a presented log file) describing desired modification(s) to the generated log file (320). In other embodiments, administration software 108 modifies the generated log files in near real-time with any modifications that are made to the generated log file via user interface 110 (i.e., without first detecting a user interaction indicating that the review of the generated log file is complete). If no modifications are made to the generated log file (318, NO branch), the generated log file is sent to one or more approval consoles (324), such as approval console 112, and/or transferred to the support-service provider (328), as discussed herein.

Embodiments of the present invention recognize that some information security policies may advantageously require that log files be approved by someone other than a system administrator, for example, prior to transferring the log files to a support-service provider. Accordingly, some embodiments of the present invention provide for such approvals. In the embodiment depicted in FIG. 3B, administration software 108 determines whether or not administration software 108 is configured to (i) require that the generated log file, including any modifications, be sent to approval console 112 or (ii) permit a transfer of the generated log file, including any modifications, to the support-service provider (e.g., sent to call-homer server 130 via network 120) without having the generated log file approved (322). Some embodiments of administration software 108 require that the generated log file be sent to approval console 112 (i.e., 322 is omitted from operations 300), and other embodiments of administration software 108 do not provide the capability to send the generated log file to approval console 112 (i.e., 322, 324, and 326 are omitted from operations 300). If administration software 108 determines that administration software 108 is configured to permit a transfer of the generated log file to the support-service provider without obtaining approval of the generated log file (322, NO branch), administration software 108 transfers the log file to the support-service provider in accordance with one or more selected transfer options, if any, as described herein. If administration software 108 determines that administration software 108 is configured to require that the generated log file be approved (322, YES branch), administration software 108 sends the generated log file to approval console 112 (324). In various embodiments, administration software 108 can send the generated log file to one or more approval consoles among a plurality of approval consoles. Until administration software 108 receives an approved log file from approval console 112 (326, NO branch), administration software 108 remains idle with respect to the generated log file but may execute operations 300 with respect to other events. If an approved log file has been received (e.g., a log file including modifications made on one or more approval consoles) or the log file that was sent to the approval console(s) is approved for transfer to the support-service provider (i.e., no modifications were made to the log file on the approval console(s); 326, YES branch), administration software 108 transfers the log file to the support-service provider in accordance any selected transfer options (328), as described herein.

In some embodiments, approval console 112 is configured similarly to system administration console 106 in order to permit a user of approval console 112 to modify the log file using the options described with respect to system administration console 106 and administration software 108. Accordingly, the approved log file may differ from the log file sent to approval console 112 in situations where a user of approval console 112 modifies the log file in order to conform the log file to an information security policy. Approval console 112 can also include provisions for printing and/or archiving the log file for audit purposes. Additionally, approval console 112 can transfer log file(s) to the support-service provider (e.g., send log file(s) to call-home server 130 via network 120) in some embodiments of the present invention.

Embodiments of the present invention also recognize that a customer's information security policy can mandate how information (e.g., log files) can be transferred to various entities (e.g., support-service providers). For example, some information security policies may permit log files to be transferred using an established call-home infrastructure (e.g., transferring log files to call-home server 130 via network 120), while other information security policies may require that log files be copied to physical media (e.g., paper, optical disc(s), or universal serial bus (USB) drives) and physically transferred to a support-service provider. Some embodiments of the present invention provide the capability to configure administration software 108, via user interface 110 of system administration console 106, to transfer log files to a support-service provider in compliance with various restrictions on transferring information. For example, administration software 108 can present, on user interface 110, a plurality of data transfer options for configuring how administration software 108 is to transfer log files.

In various embodiments, administration software 108 can be (i) configured to transfer log files generated by all instances of device software 104 using the same data transfer options, (ii) configured to transfer log files using different combinations of data transfer options based on the instances of device software 104 that generated the respective log files, or (iii) configured to permit a user of system administration console 106 to select or modify data transfer options for each generated log file. Examples of data transfer options include: encrypting log files using various encryption techniques; compressing log files using various compression techniques; transferring log files via an established call-home infrastructure; transferring log files using various electronic messaging protocols; printing log files to paper; copying log files to optical disc(s); and/or copying log files to USB drives. Other embodiments of the present inventions provide one or more versions of administration software 108 that respectively comply with specific types of restrictions on transferring information to support-service providers or other entities.

Figure 4:
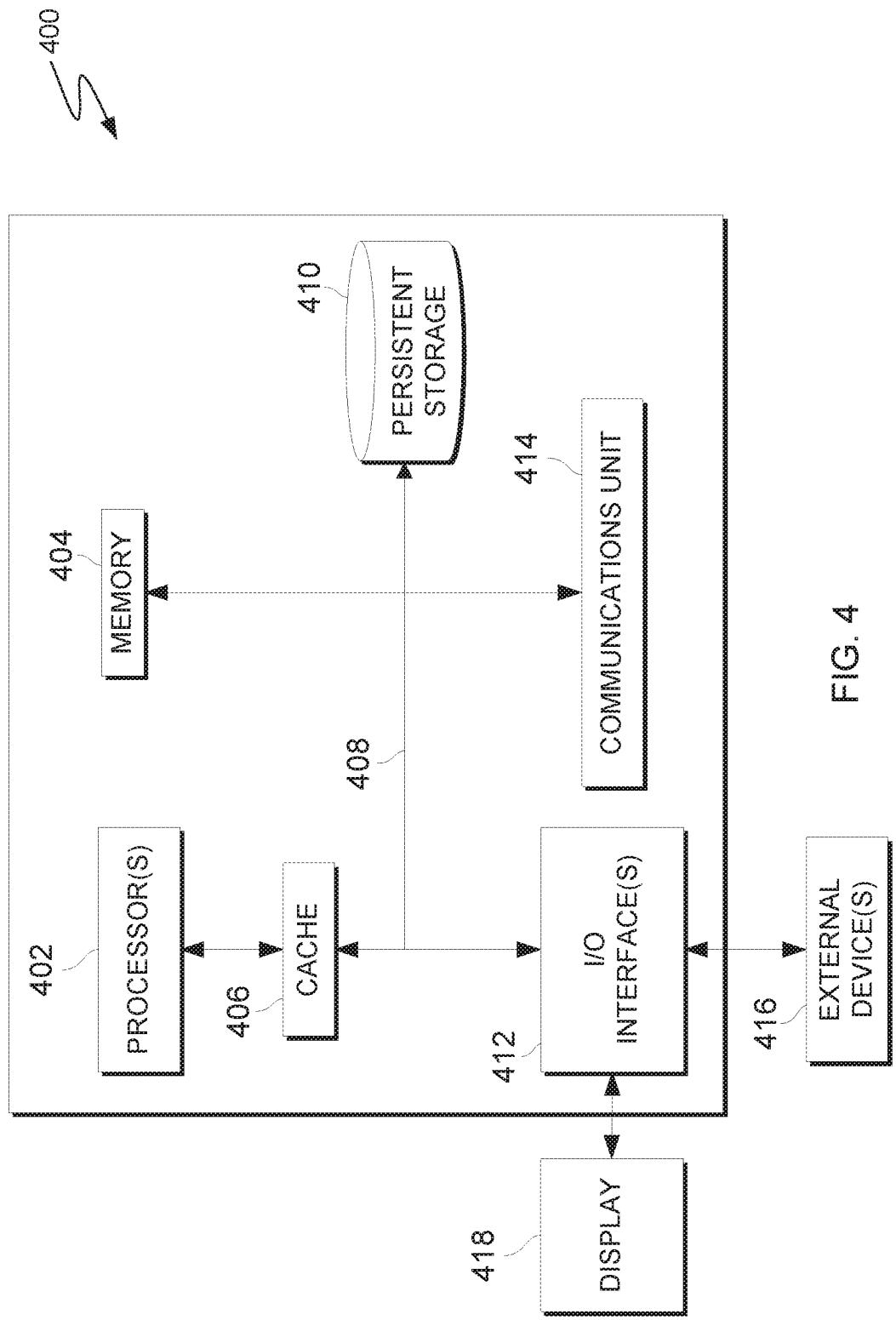
FIG. 4 is a block diagram of components of a computing device in a call-home system, in accordance with an embodiment of the present invention.

FIG. 4 is a block diagram of components of a computing device, generally designated 400, in accordance with an embodiment of the present invention. In one embodiment, computing system 400 is representative of one or more of (i) customer devices 102, (ii) system administration console 106, (iii) approval console 112, and (iv) call-home server 130 within call-home system 100 and includes respective software, as described herein.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (110) interface(s) 412, communications unit 414, and communications fabric 408. Communications fabric 408 provides communications between cache 406, memory 404, persistent storage 410, communications unit 414, and input/output (110) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computer system 400. For example, I/O interface(s) 412 may provide a connection to external device(s) 416 such as a keyboard, a keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, an alert on a system administrator console, wherein the alert is generated and sent to the system administrator console by a customer device in response to the customer device (i) detecting an event that is associated with a product for which a support-service is provided and (ii) determining that the customer device requires approval to generate the log file;
   sending to the customer device, via the system administrator console and by one or more computer processors, a request to generate a log file that includes information describing, at least in part, the event;
   receiving on the system administrator console, by one or more computer processors, the log file generated by the customer device in response to the customer device receiving the request;
   presenting, by one or more computer processors, the log file on a user interface of the system administrator console;
   detecting, by one or more computer processors, one or more interactions with the user interface that are associated with one or more instructions to modify the log file in compliance with an information security policy;
   automatically applying, by one or more computer processors, one or more modifications to confidential information within the log file, based on the one or more interactions, to create a modified version of the log file in compliance with an information security policy, wherein the one or more modifications include at least one of (i) a modification that omits confidential information from the log file, (ii) a modification that redacts confidential information in the log file, and (iii) a modification that obfuscates confidential information in the log file; and
   transferring, by one or more computer processors, the modified version of the log file to a call-home server based on one or more data transfer options.

2. The method of claim 1, further comprising:
   presenting on the user interface, by one or more computer processors, a list of configuration options including the one or more configuration options, wherein the configuration options include at least one of (i) an option to automatically omit confidential information from the log file, (ii) an option to automatically redact confidential information in the log file, and (iii) an option to automatically obfuscate confidential information in the log file; and
   sending to the customer device, by one or more computer processors, (i) one or more instructions to generate the log file based on one or more selected configuration options and (ii) one or more instructions to send the log file to the system administrator console.

3. The method of claim 2, wherein the one or more configuration options are presented on the user interface in response to receiving on the system administrator console, by one or more computer processors, the alert from the customer device.

4. The method of claim 3, wherein:
   the option to automatically omit confidential information from the log file is associated with a type of confidential information defined by the information security policy;
   the option to automatically redact confidential information in the log file is associated with the type of confidential information defined by the information security policy; and
   the option to automatically obfuscate confidential information in the log file is associated with the type of confidential information defined by the information security policy.

5. The method of claim 4, wherein the one or more configuration options include an option to identify a specific term in the log file based on a search string, and wherein the user interface provides at least one of (i) an option to omit an instance of the specific term from the log file, (ii) an option to redact the instance of the specific term in the log file, and (iii) an option to obfuscate the instance of the specific term in the log file.

6. The method of claim 1, further comprising:
   based on a search string, identifying, by one or more computer processors, a specific term in the log file, wherein the one or more modifications include at least one of (i) a modification that omits an instance of the specific term from the log file, (ii) a modification that redacts the instance of the specific term in the log file, and (iii) a modification that obfuscates the instance of the specific term in the log file.

7. The method of claim 1, further comprising:
sending, by one or more computer processors, the log file from the system administrator console to an approval console; and
receiving on the system administrator console, by one or more computer processors, at least one of an approval and an approved version of the log file from the approval console.

8. The method of claim 1, wherein the one or more data transfer options include at least one of (i) an option to encrypt the log file, (ii) and option to compress the log file, and (iii) an option to send the log file to the call-home server via email.

9. A method comprising:
presenting on a user interface of a system administrator console, by one or more computer processors, one or more configuration options, wherein the one or more configuration options include at least one of (i) an option to automatically omit confidential information from one or more log files in compliance with an information security policy, (ii) an option to automatically redact confidential information in the one or more log files in compliance with the information security policy, and (iii) an option to automatically obfuscate confidential information in the one or more log files in compliance with the information security policy;
sending to a customer device, by one or more computer processors, (i) one or more instructions to automatically generate the one or more log files based on one or more selected configuration options;
receiving on the system administrator console, by one or more computer processors, a log file from the customer device, wherein the customer device automatically generated the log file in response to receiving the one or more instructions form the system administrator console and in response to detecting an event that is associated with a product for which a support-service is provided, and wherein the log file describes, at least in part, the event;
presenting, by one or more computer processors, the log file on the user interface of the system administrator console; and
transferring, by one or more computer processors, the log file to a call-home server based on one or more data transfer options.

10. The method of claim 9, wherein the one or more configuration options are presented on the user interface in response to receiving on the system administrator console, by one or more computer processors, an alert from the second computing device, wherein the alert describes, at least in part, the event that is associated with the product for which the support-service is provided.

11. The method of claim 10, wherein:
the option to automatically omit confidential information from the log file is associated with a type of confidential information defined by the information security policy;
the option to automatically redact confidential information in the log file is associated with the type of confidential information defined by the information security policy; and
the option to automatically obfuscate confidential information in the log file is associated with the type of confidential information defined by the information security policy.

12. The method of claim 11, wherein the one or more configuration options include an option to identify a specific term in the log file based on a search string, and wherein the user interface provides at least one of (i) an option to omit an instance of the specific term from the log file, (ii) an option to redact the instance of the specific term in the log file, and (iii) an option to obfuscate the instance of the specific term in the log file.

13. The method of claim 12, wherein the one or more data transfer options include at least one of (i) an option to encrypt the log file, (ii) and option to compress the log file, and (iii) an option to send the log file to the call-home server via email.

14. The method of claim 13, further comprising:
sending, by one or more computer processors, the log file from the system administrator console to an approval console; and
receiving on the system administrator console, by one or more computer processors, at least one of an approval and an approved version of the log file from the approval console.

15. A computer system comprising:
one or more computer processors;
one or more computer readable storage media;
program instructions stored on the one or more computer readable storage media for execution by at least one of the one or more processors, the program instructions comprising:
program instructions to receive an alert on a system administrator console, wherein the alert is generated and sent to the system administrator console by a customer device in response to the customer device (i) detecting an event that is associated with a product for which a support-service is provided and (ii) determining that the customer device requires approval to generate the log file;
program instructions to send to the customer device, via the system administrator console, a request to generate a log file that includes information describing, at least in part, the event;
program instructions to receive on the system administrator console the log file generated by the customer device in response to the customer device receiving the request;
program instructions to present the log file on a user interface of the system administrator console;
program instructions to detect one or more interactions with the user interface that are associated with one or more instructions to modify the log file in compliance with an information security policy;
program instructions to automatically apply one or more modifications to confidential information within the log file, based on the one or more interactions, to create a modified version of the log file in compliance with the information security policy, wherein the one or more modifications include at least one of (i) a modification that omits confidential information from the log file, (ii) a modification that redacts confidential information in the log file, and (iii) a modification that obfuscates confidential information in the log file; and
program instructions to transfer the modified version of the log file to a call-home server based on one or more data transfer options.

16. The computer system of claim 15, the program instructions further comprising:

program instructions to present on the user interface, a list of configuration options including the one or more configuration options, wherein the configuration options include at least one of (i) an option to automatically omit confidential information from the log file, (ii) an option to automatically redact confidential information in the log file, and (iii) an option to automatically obfuscate confidential information in the log file; and program instructions to send to the customer device (i) one or more instructions to generate the log file based on one or more selected configuration options and (ii) one or more instructions to send the log file to the system administrator console.

17. The computer system of claim 16, wherein the one or more configuration options are presented on the user interface in response to receiving, on the first computing device, an alert from the customer device.

18. The computer system of claim 17, wherein:

the option to automatically omit confidential information from the log file is associated with a type of confidential information defined by the information security policy;

the option to automatically redact confidential information in the log file is associated with the type of confidential information defined by the information security policy; and the option to automatically obfuscate confidential information in the log file is associated with the type of confidential information defined by the information security policy.

19. The computer system of claim 18, wherein the one or more configuration options include an option to identify a specific term in the log file based on a search string, and wherein the user interface provides at least one of (i) an option to omit an instance of the specific term from the log file, (ii) an option to redact the instance of the specific term in the log file, and (iii) an option to obfuscate the instance of the specific term in the log file.

20. The computer system of claim 15, the program instructions further comprising:

program instructions to, based on a search string, identify a specific term in the log file, wherein the one or more modifications include at least one of (i) a modification that omits an instance of the specific term from the log file, (ii) a modification that redacts the instance of the specific term in the log file, and (iii) a modification that obfuscates the instance of the specific term in the log file.

* * * * *